United States Patent [19]
Atal et al.

[11] Patent Number: 5,737,724
[45] Date of Patent: Apr. 7, 1998

[54] SPEECH RECOGNITION EMPLOYING A PERMISSIVE RECOGNITION CRITERION FOR A REPEATED PHRASE UTTERANCE

[75] Inventors: Bishnu Saroop Atal, New Providence; Raziel Haimi-Cohen, Springfield; David Bjorn Roe, Berkeley Heights, all of N.J.

[73] Assignee: Lucent Technologies Inc., Murray Hill, N.J.

[21] Appl. No.: 695,140

[22] Filed: Aug. 8, 1996

Related U.S. Application Data

[63] Continuation of Ser. No. 158,096, Nov. 24, 1993.
[51] Int. Cl.$^6$ .................................................. G01L 5/06
[52] U.S. Cl. .................................................. 704/251; 704/236
[58] Field of Search ............................ 395/2.4, 2.6, 2.64, 395/2.45–2.48, 2.53, 2.61, 2.84

[56] References Cited

U.S. PATENT DOCUMENTS

| | | | |
|---|---|---|---|
| 4,348,550 | 9/1982 | Pirz et al. | 179/1 |
| 4,489,434 | 12/1984 | Moshier | 395/2.61 |
| 4,601,054 | 7/1986 | Watari et al. | 382/1 |
| 4,618,984 | 10/1986 | Das et al. | 395/2.53 |
| 4,759,068 | 7/1988 | Bahl et al. | 381/43 |
| 4,827,520 | 5/1989 | Zeinstra | 395/2.84 |
| 5,452,397 | 9/1995 | Ittycheriah et al. | 395/2.49 |

FOREIGN PATENT DOCUMENTS

| | | | |
|---|---|---|---|
| 0573301A1 | 12/1993 | European Pat. Off. | G10L 5/06 |
| 0625775 | 11/1994 | Germany | G01L 5/06 |
| 2170936 | 8/1986 | United Kingdom | G10L 3/00 |

OTHER PUBLICATIONS

J.G. Wilpon et al., "Application of Hidden Markov Models for Recognition of a Limited Set of Words in kUnconstrained Speech,"*Proc. IEEE ICASSP*-89, vol. S6.1, 254–257 (May 1989).

R. C. Rose et al., "A Hidden Markov Model Based Keyword Recognition System,"*Proc. IEEE ICASSP*-90, vol. 1, 129–132 (Apr. 1990).

S. S. Awad, et al. "A Voice Controlled Telephone Dialer", *IEEE Transactions On Instrumentation And Measurement*, vol. 38, No. 1, pp. 119–125 (1989).

*Primary Examiner*—David D. Knepper
*Attorney, Agent, or Firm*—Thomas A. Restaino; Kenneth M. Brown

[57] ABSTRACT

The invention relates to a method and apparatus for speech recognition, the speech to be recognized including one or more words. Recognition is based on an analysis of a first and a second utterance. In accordance with the invention, the first utterance is compared to one or more models of speech to determine a similarity metric for each such comparison. The model of speech which most closely matches the first utterance is determined based on the one or more similarity metrics. The similarity metric corresponding to the most closely matching model of speech is analyzed to determine whether the similarity metric satisfies a first recognition criterion. The second utterance is compared to one or more models of speech associated with the most closely matching model (which may include the most closely matching model) to determine a second utterance similarity metric for each such comparison. The one or more second utterance similarity metrics are analyzed to determine whether the one or more metrics satisfies a second recognition criteria. The second utterance is recognized has the phrase corresponding to the most closely matching model of speech when the first and second recognition criteria are satisfied. The present invention has application to many problems in speech recognition including isolated word recognition and command spotting. An illustrative embodiment of the invention in the context of a cellular telephone is provided. Other embodiments are also discussed.

36 Claims, 3 Drawing Sheets

SPEECH RECOGNITION EMPLOYING A PERMISSIVE RECOGNITION CRITERION FOR A REPEATED PHRASE UTTERANCE

This application is a continuation of application Ser. No. 08/158096, filed on Nov. 24, 1993.

FIELD OF THE INVENTION

The present invention relates to the field of speech recognition generally and, for example, to the detection of commands in continuous speech.

BACKGROUND OF THE INVENTION

A command spotting system is a speech recognition system which monitors an audio input channel and takes a predefined action whenever a specific utterance (the command) appears in the input. The input may contain free speech, noise, music, etc., and generally does not comply with any a-priori known model. For each command to be recognized by the system, the system keeps a statistical model (for example, a template or a hidden Markov model (HMM) well known in the art) which defines the likelihood that a given segment of input contains the command utterance. During its operation a conventional command spotting system continually generates conjectures (or hypotheses) about the identities and locations of command words in the currently observed input. Each of these hypotheses is tested against a respective command model and a score is generated for its respective likelihood. Such a score may be determined by, for example, conventional Viterbi scoring. If the score exceeds a threshold T, the hypothesis is considered as accepted and the action associated with it is effected. Otherwise the conjecture is rejected.

The probability distribution of the score of either a correct or a false hypothesis depends on a variety of factors, including the speaker, the transducer and the acoustical environment. The threshold T is usually set sufficiently high to ensure an acceptably low false alarm rate over the whole range of expected operating conditions. Consequently, in various adverse conditions, the scores of correct hypotheses have a low probability of exceeding the threshold. Therefore, in these conditions the system seems to "ignore" the user. Lowering the threshold might solve these "local" problems, however, it may also increase the overall false alarm rate. Therefore, in general the utility of this approach is limited.

SUMMARY OF THE INVENTION

The present invention is directed to a speech recognition technique suitable for, among other applications, command spotting in a range of operating conditions. The present invention takes advantage of the fact that a user of a given speech recognition system is likely to repeat a phrase (whether prompted or not) when a first utterance of the same phrase has not been recognized by the given system. So, for example, given a speech recognition system suitable for command spotting, a user may utter a command phrase which fails to score sufficiently high to be accepted as a command. Under such circumstances, the user may conclude that the phrase was not recognized and thereafter may repeat the command. An illustrative embodiment of the present invention employs both the first and repeated utterances of the command in recognizing the command. Thus, recognition may be accomplished by, for example, comparing both scores of consecutively spoken utterances to a lower threshold than would otherwise be used for a single utterance considered alone.

In accordance with the present invention, an utterance of a phrase (which may include one or more words) is recognized by comparing a first utterance to one or more models of speech to determine a similarity metric for each such comparison; determining which model of speech most closely matches the first utterance based on the one or more similarity metrics; determining whether the similarity metric corresponding to the most closely matching model of speech satisfies a first recognition criterion; comparing a second utterance to the most closely matching model of speech to determine a second utterance similarity metric; determining whether the second utterance similarity metric satisfies a second recognition criterion; and recognizing the second utterance based on said most closely matching model of speech when the first and second recognition criteria are satisfied.

DETAILED DESCRIPTION

Introduction

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 1 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

An Illustrative Embodiment

Figure 1:
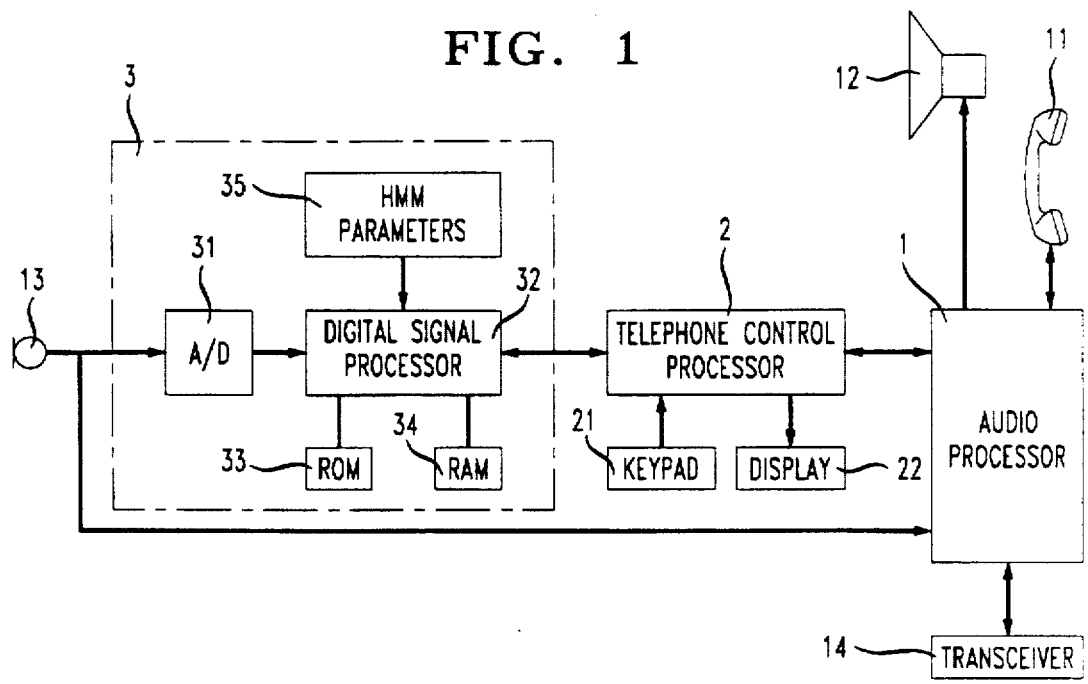
FIG. 1 presents an illustrative cellular telephone embodiment in accordance with the present invention.

FIG. 1 presents an illustrative embodiment of the present invention which concerns a cellular telephone employing speech recognition. The illustrative cellular telephone comprises a hands-free microphone 13, a speech recognition system 3, a telephone control processor 2 and related I/O peripherals 21, 22, an audio processor 1, radio transceiver 14, a hands-free loudspeaker 12, and handset 11.

The audio processor 1 is conventional in the art and performs various functions under the control of the telephone control microprocessor 2. For example, audio processor 1 receives audio input signals from handset 11, microphone 13 and transceiver 14. Each of these signals is processed as required by the prevailing cellular communication standard (e.g. IS-54) as well as any specific telephone system requirements. Processor 1 directs audio output signals to handset 11, handsfree loudspeaker 12 and the transceiver 14. Processor 1 generates various audible signals for user guidance (e.g. telephone ringing) and decodes control messages received from the transceiver 14 (e.g. busy signals) for use by the telephone control microprocessor 2. Furthermore, audio processor 1 encodes messages received from the telephone control microprocessor 2 into audio signals and sends them to the transceiver 14.

The telephone control processor 2 may also be of the type which is conventional in the art. Processor 2 controls telephone call processing and the general operation of the cellular telephone. Processor 2 receives input from keypad 21, the speech recognition system 3 and the audio processor 1, and it issues control interactions to the display 22, the audio processor 1 and the speech recognition system 3. The speech recognition system 3 appears to the telephone control microprocessor as a source of control input similar to that of the keypad 21. The telephone control microprocessor 2 may change the mode of operation of the speech recognition system by sending appropriate instructions, as explained below.

The speech recognition system 3 comprises a conventional analog-to-digital (A/D) converter 31 which converts the audio signal picked up by the microphone 13 into a stream of digital samples; a digital signal processor 32, such as the AT&T DSP16A, which processes digital signal samples generated by A/D converter 31; a ROM 33, which contains program instructions executed by the digital signal processor 32 (see FIGS. 2 and 3 hereof); an HMM parameter memory 35 (which is a non-volatile memory such as EEPROM, ROM, flash RAM, battery backed RAM, etc.) which contains parameters of hidden Markov models (HMM) for the phrases to be recognized; and a RAM 34, in which temporary computation results are stored. In some embodiments, several of the components (31, 32, 33, 34, 35) may be physically located on the same electronic chip.

HMM parameter memory 35 includes HMMs which correspond to the phrases to be recognized by the system 3. Illustratively, such phrases include command phrases useful for operating the telephone (e.g., "off-hook," "dial," "hand-up," etc.) as well as a repertory list of names of people or places to be called (e.g., Terry, Matt, Chris, home, etc.). Models representing spoken numbers (e.g., "one," "two," . . . , "nine," etc.) may also be stored. The training and storage of such models is conventional within the art.

While the present invention is illustratively described in the context of a cellular telephone, it will be apparent to those of ordinary skill in the art that the cellular telephone is merely illustrative of devices capable of utilizing the speech recognition capability of the present invention. Other such utilization devices include, for example, conventional home and business telephones, cordless telephones, personal communicators, personal paging devices, personal data organizers, computers (such as personal computers) and computer terminals. In addition, the present invention has application to telecommunication network-based services which are accessed or controlled by speech recognition devices or systems.

Recognition Modes

The speech recognition system 3 of the illustrative embodiment operates in the following modes under the control of digital signal processor 32. These modes are selectable by the telephone control processor 2.

Command Spotting Mode

Speech recognition system 3 is placed in command spotting mode by a signal from processor 2 indicating that no telephone control operation initiated by a user is currently pending. In this mode, the system 3 checks each incoming speech utterance from A/D converter 31 for the presence of a command phrase for which one or more HMMs are stored in the HMM parameter memory 35. In other words, in command spotting mode, recognizer 3 employs HMMs in memory 35 which correspond to command phrases. An utterance from the user is accepted as a command if the presence of such a command phrase is confirmed by the system 3. Otherwise, the utterance is rejected. If the utterance is accepted the speech recognizer 3, a signal is sent to the telephone control microprocessor 2 indicating that a specific command phrase was detected. Telephone control microprocessor 2 then initiates the operation associated with the command (e.g. hanging up). If the utterance is rejected, no message is sent to processor 2. The operation of processor 2 in response to accepted commands is conventional within the art.

Dialing Mode

Speech recognition system 3 is placed in dialing mode by a signal from processor 2 indicating that the user has initiated a dialing procedure. This dialing procedure might have been initiated either by pressing a keypad button or by saying a command phrase (e.g., "dial") which invokes the dialing operation. In this mode, recognizer 3 uses HMMs of name phrases (instead of command phrases as in the command spotting mode), where each name phrase is associated with a corresponding telephone number. Such name phrase HMMs and associated telephone numbers are stored in memory 35.

If an utterance of a name phrase is accepted by recognizer 3, a message o indicating the recognition of a name phrase has been accepted is sent to processor 2. Telephone control processor 2 then dials the telephone number associated with the recognized name phrase and notifies the user that name has been recognized correctly.

If the speech recognizer 3 rejects an utterance, it nevertheless sends a message to the telephone control microprocessor 2, indicating that an utterance was rejected. The telephone control microprocessor then prompts the user to repeat the utterance. The notification and prompting are typically done by a distinctive tone followed the playing of an appropriate voice message.

Recognizer Operation

To simplify the discussion of invention in the context of the illustrative embodiment of FIG. 1, the invention will be presented in terms of the recognition system 3 in command mode. It will be apparent to those of ordinary skill that the principles of the present invention illustrated by this discussion am applicable to recognizer operation in dialing mode.

Figure 2:
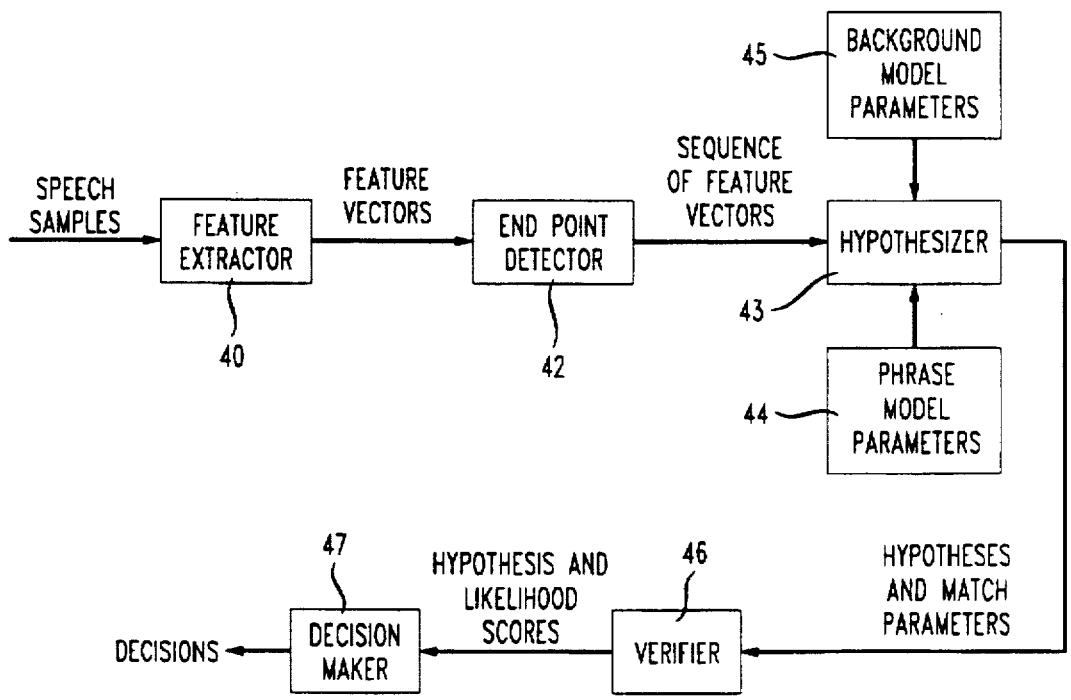
FIG. 2 presents a block flow diagram of the processing of the digital signal processor of the speech recognition system of FIG. 1.

FIG. 2 is a block flow diagram of the processing performed by the digital signal processor 32 of the speech recognition system 3. Each block in the diagram represents a distinct processing function which is typically implemented as a subroutine of the program stored in ROM 33.

According to the diagram, speech samples provided by A/D converter 31 are processed by conventional feature extractor 40 to produce a stream of vectors of speech features, typically at a rate of 50 to 150 vectors/second. Each such vector contains 10 to 30 components of speech features relating to speech energy, delta speech energy, cepstrum coefficients, and delta cepstrum coefficients.

The stream of feature vectors is processed by conventional endpoint detector 42 which determines the beginning and end point of utterances embedded in the speech. Endpoint detector output comprises finite sequences of feature vectors, where each sequence of vectors corresponds to a single utterance.

The hypothesizer 43 receives those sequences of feature vectors and generates a hypothesis as to their verbal contents. In doing so the hypothesizer uses HMM models for the phrases, the parameters of which are stored in the phrase models parameters block 44, and a HMM background model, the parameters of which are stored in the background model parameters block 45. The term "acoustic" refers to silence, noise or any speech which is not one of the command phrases. Physically all these models are located in the HMM parameters memory 35 of FIG. 1.

The hypothesizer 43 makes two types of hypotheses. The first type of hypothesis (referred to as a "background hypotheses") assumes that the feature vector sequence includes only the background. The second type of hypotheses (referred to as a "phrase hypotheses") assumes that the feature sequence includes a command word, possibly followed or preceded by background. For each of these two hypotheses, the hypothesizer applies a conventional dynamic programming optimization procedure, such as Viterbi decoding (or scoring), which determines the most likely hypothesis of that type and a corresponding numerical value (or score) of the estimated likelihood of the hypothesis.

In addition, the dynamic programming procedure produces some additional parameters for the phrase hypothesis, which parameters are referred to as "match parameters." A first match parameter is generated by forming the difference between an expected phrase duration for the most likely phrase hypothesis and the phrase duration determined by the hypothesizer for the utterance corresponding to the most likely phrase hypothesis. A second match parameter is generated by forming the mean of the absolute value of the difference between expected HMM state durations of the most likely hypothesis and the state durations determined by the hypothesizer 43. A third match parameter is generated by forming the difference between the likelihood scores for the most likely hypothesis of the best phrase hypothesis and the second best phrase hypothesis. As is well known to persons of ordinary skill in the art, data for use in generating match parameters is available as part of conventional speech recognition processes employing, e.g., HMMs and Viterbi scoring.

The output of the hypothesizer 43 includes (i) the most likely phrase hypothesis; (ii) a corresponding score, which is the difference of the logs of the phrase hypothesis likelihood estimate and the background hypothesis likelihood estimate; and (iii) the match parameters.

The verifier 46 receives the output of the hypothesizer 43 and checks if each of the match parameters is within a corresponding prescribed range. The verifier 46 checks whether the first match parameter is within the range —½ to 1. Verifier 46 checks whether the second match parameter is within a range of looms. Verifier 46 also checks whether the third match parameter is within 10% of the best hypothesis score. (Any of these ranges may be varied to suit particular operating environments.) If the match parameters are within such ranges, the verifier 46 passes the hypothesis and its respective scores to the decision maker 47. Otherwise, the hypothesis is rejected.

The decision maker 47 decides whether to accept or reject the most likely phrase hypothesis. If the hypothesis is accepted by the decision maker 47, the hypothesis is reported to the telephone control processor 2 of FIG. 1 (in name dialing mode rejections are reported as well). The method of operation of the decision maker 47 makes use of the concept of an attention interval for a phrase.

Decision maker 47 treats a most likely phrase hypothesis in different ways depending on whether the phrase occurred within or outside an attention interval for the phrase. An attention interval is a time period beginning at a predetermined time and having predetermined duration. An attention interval is established when a most likely hypothesis score exceeds a certain threshold. The interval is that in which a second utterance of the same phrase must be received in order to be recognized by the embodiment (when the score of the second utterance also exceeds the threshold). Initially, there are no attention intervals defined. In the course of decision maker 47 operation, various attention intervals may be established, cancelled or terminated for specific phrases. The method by which the decision maker 47 makes its decision, and by which it may define attention intervals, is explained in the block flow diagram of FIG. 3.

Figure 3:
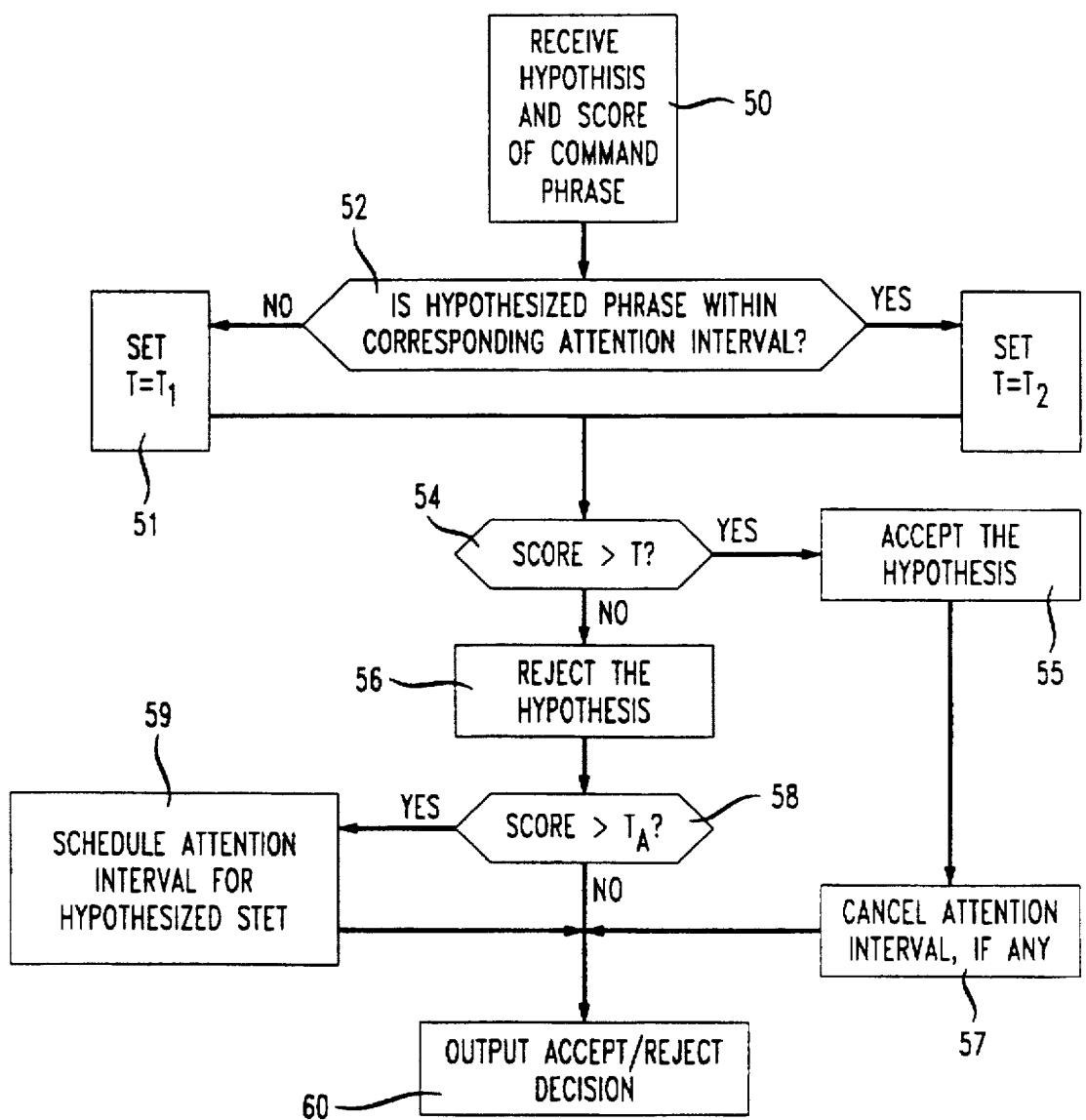
FIG. 3 presents a block flow diagram of the processing of the decision maker block of FIG. 2.

The flow diagram of FIG. 3 begins step in 50 where the hypothesized phrase and its corresponding score are received. Step 52 checks if the hypothesized phrase has occurred within a corresponding attention interval. If so, control is directed to block 53 wherein a threshold T set to a fixed value $T_2$. If not, control is directed to block 51 wherein threshold T is set to a fixed value $T_1$. Illustratively, $T_1 > T_2$.

Step 54 compares the score of the hypothesized phrase to the threshold T. If the score of the hypothesis is greater than T, control is passed to step 55 which accepts the hypothesis. Control then passes to step 57 which cancels any existing attention intervals for the hypothesized phrase. Finally, step 60 generates an output signal for processor 2 indicating an acceptance of the hypothesis.

If the score of the hypothesis is not greater than T, control is passed to step 56 which rejects the hypothesis. In that case, control is passed to step 58 which determines whether an attention interval should be established for the hypothesized phrase. This is done by checking if the score of the hypothesis is greater than a threshold $T_A$. Threshold $T_A$ represents a minimum confidence level below which no tentative acceptance of the phrase should be made. Illustratively, threshold $T_A$ may assume any desired value less than or equal to $T_2$. If the score of the hypothesis is greater than $T_A$, control is passed to step 59.

Step 59 establishes an attention interval for the hypothesized phrase by setting times for the beginning and end of the interval and associating the phrase identity with the interval. In the illustrative command spotting mode, the beginning and ending times are set at fixed delays from the time at which the hypothesized command phrase was received by system 3 (in an illustrative dialing mode, the beginning and ending times may be set at fixed delays from the time the telephone prompt asking the user to repeat the input was issued). In an illustrative command spotting mode, an established attention interval begins at a delay of 1 second and ends at a delay of 5 seconds.

The delays may be fixed by a system designer advantageously according to the following consideration. Assuming that the phrase hypothesis is correct (i.e., it correctly identifies the spoken phrase) but it is nevertheless rejected by the recognition system 3, it is likely that the user of the system will repeat the phrase once he or she realizes that the system did not accept the input. The attention interval should be defined as the time period in which the user is likely to repeat the command under that assumption. In an illustrative command spotting mode, the delay to the beginning of the attention interval should be the response time of the system for accepted utterances plus the time that the user needs to notice that the system fails to respond. In an illustrative name dialing mode, the delay should be set to equal an estimated reaction time of a user to a prompt to repeat the name. The duration of either attention interval should advantageously span the variability in reaction times among the user population.

Illustratively, step 59 may operate to establish several attention intervals to be in effect at the same time for different phrases, or for the same phrase. If this situation is undesired due to processing complexity, step 59 may be modified so as to cancel all previously established attention intervals when a new interval is established.

If the decision of step 58 is NO, control reaches step 60; else, if the decision is YES, control reaches step 60 after the passing through step 59. In either case, step 60 generates an output signal indicating the rejection of the hypothesis. The rejection signal will be passed to processor 2 only in dialing mode.

Figure 4:
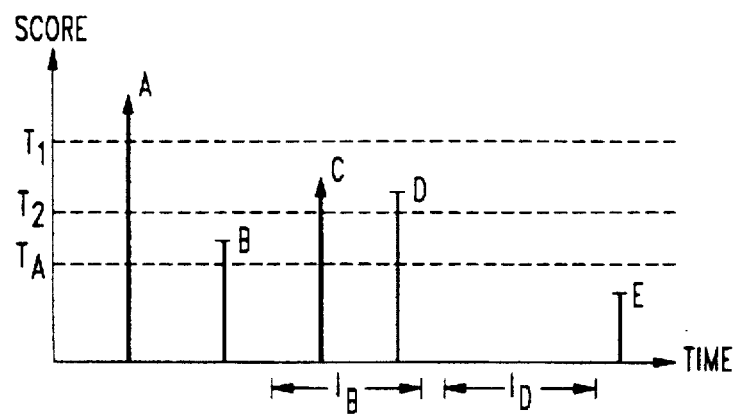
FIG. 4 presents an example of a recognition process performed by the illustrative embodiment of FIGS. 1–3.

The operation of the decision maker 47 of FIG. 2 may be further appreciated by reviewing the example presented in FIG. 4. In this example, the system is in command spotting mode. Illustratively, the system is designed to recognize a single command (e.g., "off-hook"). The horizontal axis of FIG. 4 represents time, while the vertical axis represents recognition score. The thresholds $T_1, T_2, T_A$ are displayed as horizontal dashed lines. Attention intervals are displayed as horizontal segments under the time axis. Each hypothesis of the single command is displayed as a vertical segment. The height of a segment represents the score of the hypotheses. The horizontal position of a vertical segment represents the time at which an utterance occurred. Accepted hypotheses of the command are marked by an arrowhead at their top.

As shown in FIG. 4, hypothesis A is not within a corresponding attention interval (no event has yet occurred to define an attention interval). According to steps 52–54 of FIG. 3, $T=T_1$, score>$T_1$, and the hypothesis is accepted.

Hypothesis B is also not within a corresponding attention interval. Therefore, $T=T_1$ according to steps 52 and 51. However, since the score of hypothesis B does not exceed $T_1$, hypothesis B is rejected (see steps 54 and 56). Nevertheless, since the score of hypothesis B does exceed $T_A$, an attention interval $I_B$ is established (see steps 58–59).

Hypothesis C occurs within the corresponding attention interval $I_B$, previously established for the command phrase. Hence, according to steps 52 and 53, $T=T_2$. Since the hypothesis score exceeds $T_2$, the hypothesis is accepted, and the attention interval $I_B$ is cancelled (see steps 54, 55, and 57; note that interval $I_B$ is shown as it is when established; acceptance of hypothesis C cuts off $I_B$ at the time of acceptance).

Hypothesis D is shown as occurring within original attention interval $I_B$. However, since $I_B$ has been cancelled by hypothesis C, interval $I_B$ is ignored. Hence, $T=T_1$ (see steps 52 and 51). Since the score of hypothesis D does not exceed $T_1$, hypothesis D is rejected. However, since its score exceeds $T_A$, attention interval $I_D$ is established (see steps 58 and 59).

Hypothesis E occurs after the termination of attention interval $I_D$. As such, $T=T_1$ (according to steps 52 and 51). Since the score of hypothesis E does not exceed $T_1$, hypothesis E is rejected (see steps 54 and 56). Furthermore, since its score does not exceed $T_A$ an attention interval is not established (see step 58).

Figure 5:
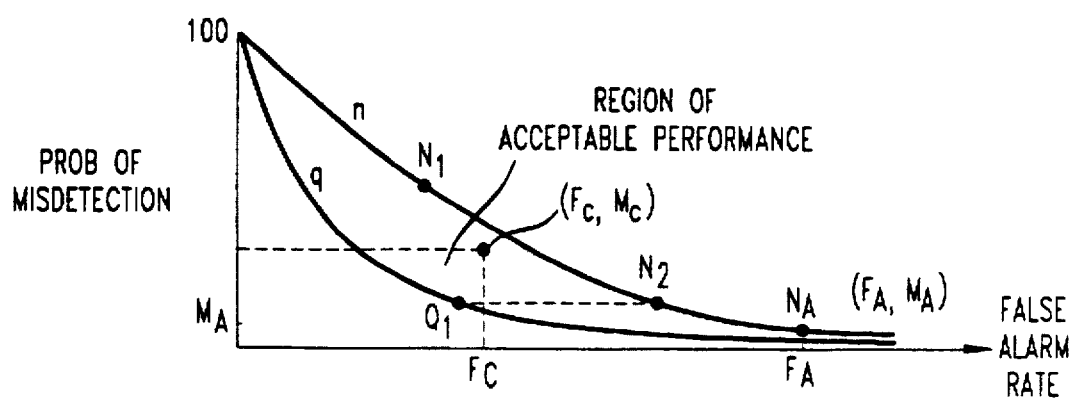
FIG. 5 presents a graph of the relationship between recognizer parameter values and recognizer performance.

The particular values for thresholds $T_1, T_2, T_A$ may be chosen based on the recognition task at hand. Illustratively, normalized threshold values are as follows: $T_1=2.5, T_2=1.5$, and $T_A=1$. FIG. 5 illustrates some of the considerations that may be involved in determining such thresholds for command spotting. Similar considerations may be used for dialing mode.

FIG. 5 is shows a graph in which the main axes represent the two main performance parameters of the system. The horizontal axis represents the false alarm rate (number of false acceptances per unit time) and the vertical axis represents the probability of miss detection, (i.e. the probability of rejection of an utterance containing a command phrase). The rectangular area defined by the origin and the point $(F_C, M_C)$ represents the region of acceptable performance. The curves q and n describe the performance of the system in a quiet and a noisy environment, respectively. Each point on each of the curves corresponds to the performance of the system given a specific value of the threshold $T_1$, under the assumption that $T_A=\infty$ (i.e., no attention intervals are ever defined, hence $T=T_A$ always). The curves are obtained experimentally through collecting statistics of the scores of utterances containing command phrases and utterances not containing them.

The quiet environment curve q passes through the acceptable performance region. Hence, a value $T_1$ may be selected such that the performance of the system will be acceptable. Let the point $Q_1$ on q correspond to such $T_1$. The noisy environment curve n does not pass through the acceptable performance region. In particular, the point $N_1$ corresponding to the selected threshold $T_1$ has an acceptable false alarm rate but an unacceptably high probability of miss detection. $T_2$ and $T_A$ may now be defined such that the probability of miss detection in the second utterance of the command word will be similar to the probability of detection of the first utterance of the command word under quiet conditions, and the overall false alarm rate of the system will be similar to that of $N_1$.

Let D be the duration of an attention interval and let $N_A$ be the point on n with coordinates $(F_A, M_A)$ such that $F_A D \ll 1$ (hence the probability of a time point to be in an attention interval created by a false hypothesis is negligible) and $M_A \ll 1$ (hence the probability that a rejected correct hypothesis will not create an attention interval is negligible). In practice such a point may often be found. $N_2$ is selected to be a point on n with the same probability of miss detection as that of $Q_1$. $T_2, T_A$ are selected to be the thresholds corresponding to $N_2, N_A$, respectively. If a correct command phrase is rejected an attention interval will almost surely be defined. Hence, the probability of miss detection in the second time around will be nearly that $Q_1$. If no command phrase is present the cumulative duration of attention intervals is negligible relative to the total duration of the speech. Hence, the threshold $T_1$ is used nearly all the time and the false alarm rate is similar to that of $N_1$.

While the description of the illustrative embodiment has concerned threshold values which do not vary with the phrase to be recognized, it will be apparent to those of ordinary skill in the art that different thresholds may be used for the recognition of different phrases. For example, certain words or commands (i.e., phrases) may have a more significant or profound effect on the operation of a utilization device than other words or commands. It may be desirable therefore to recognize such "more significant" words or commands only when recognition is determined to a relatively high degree of confidence. This relatively high degree of confidence may be insured through the use of higher recognition thresholds than those used for less significant phrases.

This concept may also extend to the state of utilization device operation. That is, a given phrase may have a low level of significance when the utilization device is in a first state and a higher level of significance when the utilization device is in another state. Consequently, recognition thresholds may be set as a function of the environment in which the a speech recognizer sits (e.g., the state of a utilization device).

In some embodiments of the present invention more than one model may correspond to a single phrase (e.g., separate models for different dialects). In this case, an attention interval may be established by the score of one model while the acceptance of an utterance within the attention interval may be based on a score of a different model of the same phrase (e.g., the same phrase in a different dialect).

Although a specific embodiment of this invention has been shown and described herein, it is to be understood that this embodiment is merely illustrative of the many possible specific arrangements which can be devised in application of the principles of the invention. Numerous and varied other arrangements can be devised in accordance with these principles by those of ordinary skill in the an without departing from the spirit and scope of the invention.

We claim:

1. A method of recognizing a spoken phrase, the phrase including one or more words, the method comprising the steps of:

performing a first speech recognition process in an attempt to recognize a first utterance of the phrase, said first speech recognition process employing a first speech recognition criterion;

if said first speech recognition process does not result in recognition of said first utterance in accordance with said first recognition criterion, establishing a time interval in which to receive a second utterance of the phrase; and if said first speech recognition process does not result in recognition of said first utterance in accordance with said first recognition criterion, and if said second utterance is received during said time interval, performing a second speech recognition process in an attempt to recognize said second utterance, said second speech recognition process employing a second speech recognition criterion, wherein said second speech recognition criterion is more likely to be satisfied than said first speech recognition criterion.

2. The method of claim 1 further comprising the step of comparing the first utterance to a model reflecting acoustic background.

3. The method of claim 1 wherein the phrase corresponds to an isolated word.

4. The method of claim 1 wherein the first speech recognition process comprises the steps of:

for each of one or more models of speech, determining one or more corresponding first similarity measures based on a comparison of said corresponding model and the first utterance; and determining whether any of said first similarity measures satisfies the first recognition criterion.

5. The method of claim 4 wherein one or more of said models of speech reflects one or more predetermined words.

6. The method of claim 5 wherein one or more of said models of speech reflects an acoustic background.

7. The method of claim 4 wherein the first recognition criterion comprises a determination as to whether any of said first similarity measures exceeds a first threshold.

8. The method of claim 1 wherein the second speech recognition process comprises the steps of:

for each of one or more models of speech, determining one or more corresponding second similarity measures based on a comparison of said corresponding model and the second utterance;

determining which of said second similarity measures satisfies said second speech recognition criterion; and recognizing the second utterance as the phrase, based on a particular one of said second similarity measures which satisfies said second recognition criterion.

9. The method of claim 8 wherein the first recognition criterion comprises a determination as to whether any of said first similarity measures exceeds a first threshold and wherein the second recognition criterion comprises a determination as to whether any of said second similarity measures exceeds a second threshold less than said first threshold.

10. The method of claim 1 wherein the phrase comprises a command phase for a utilization device.

11. The method of claim 1 further comprising the step of receiving the first utterance and wherein the time interval begins at a predetermined time after receipt of the first utterance.

12. The method of claim 1 further comprising the step of issuing a prompt for the second utterance and wherein the time interval begins at a predetermined time after issuance of the prompt.

13. The method of claim 1 wherein the first recognition criterion depends on the phrase to be recognized.

14. The method of claim 1 wherein the second speech recognition criterion depends on the phrase to be recognized.

15. The method of claim 1 wherein the first speech recognition criterion depends on a state of a utilization device.

16. The method of claim 1 wherein the second speech recognition criterion depends on a state of a utilization device.

17. The method of claim 1 wherein the steps are implemented in a telecommunications network to facilitate operation of a network service.

18. The method of claim 1 wherein the steps are implemented in a computer to facilitate operation of the computer.

19. The method of claim 1 wherein said first speech recognition process does not result in recognition of said first utterance in accordance with said first recognition criterion, but nonetheless results in a determination of a most likely-spoken phrase, and wherein said second speech recognition process employs one or more models of speech which correspond to said most likely spoken phrase.

20. An apparatus for recognizing a spoken phrase, the phrase including one or more words, the apparatus comprising:

means for performing a first speech recognition process in an attempt to recognize a first utterance of the phrase, said first speech recognition process employing a first speech recognition criterion;

means for establishing a time interval in which to receive a second utterance of the phrase when said first speech recognition process does not result in recognition of said first utterance in accordance with said first recognition criterion; and means for performing a second speech recognition process in an attempt to recognize said second utterance if said first speech recognition process does not result in recognition of said first utterance in accordance with said first recognition criterion and if said second utterance is received during said time interval, said second speech recognition process employing a second speech recognition criterion, wherein said second speech recognition criterion is more likely to be satisfied than said first speech recognition criterion.

21. The apparatus of claim 20 wherein the means for performing the first speech recognition process comprises:

means for determining, for each of one or more models of speech, one or more corresponding first similarity measures based on a comparison of said corresponding model and the first utterance; and means for determining whether any of said first similarity measures satisfies the first recognition criterion.

22. The apparatus of claim 21 wherein the first recognition criterion comprises a determination as to whether any of said first similarity measures exceeds a first threshold.

23. The apparatus of claim 21 wherein one or more of said models of speech reflects one or more predetermined words.

24. The apparatus of claim 23 wherein one or more of said models of speech reflects an acoustic background.

25. The apparatus of claim 20 further comprising means for comparing the first utterance to a model reflecting acoustic background.

26. The apparatus of claim 20 wherein the phrase comprises a command phrase for a utilization device.

27. The apparatus of claim 20 further comprising means for receiving the first utterance and wherein the time interval begins at a predetermined time after receipt of the first utterance.

28. The apparatus of claim 20 further comprising means for issuing a prompt for the second utterance and wherein the time interval begins at a predetermined time after issuance of the prompt.

29. The apparatus of claim 20 wherein the first speech recognition criterion depends on the phrase to be recognized.

30. The apparatus of claim 20 wherein the second speech recognition criterion depends on the phrase to be recognized.

31. The apparatus of claim 20 wherein the first speech recognition criterion depends on a state of a utilization device.

32. The apparatus of claim 20 wherein the second speech recognition criterion depends on a state of a utilization device.

33. The apparatus of claim 20 wherein the means for performing the second speech recognition process comprises:

means for determining, for each of one or more models of speech, one or more corresponding second similarity measures based on a comparison of said corresponding model and the second utterance;

means for determining which of said second similarity measures satisfies said second speech recognition criterion; and means for recognizing the second utterance as the phrase, based on a particular one of said second similarity measures which satisfies said second recognition criterion.

34. The apparatus of claim 33 wherein the first recognition criterion comprises a determination as to whether any of said first similarity measures exceeds a first threshold and wherein the second speech recognition criterion comprises a determination as to whether any of said second similarity measures exceeds a second threshold less than said first threshold.

35. The apparatus of claim 20 wherein the phrase corresponds to an isolated word.

36. The apparatus of claim 20 wherein said means for performing a first speech recognition process comprises means for determining a most likely-spoken phrase when said first speech recognition process does not result in recognition of said first utterance in accordance with said first recognition criterion, and wherein said means for performing a second speech recognition process employs one or more models of speech which correspond to said most likely-spoken phrase.

* * * * *